(12) United States Patent
Woo et al.

(10) Patent No.: US 7,864,769 B1
(45) Date of Patent: ***Jan. 4, 2011

(54) MULTICAST PACKET REPLICATION

(75) Inventors: Hsien-Chung Woo, Fremont, CA (US); Dennis C. Ferguson, Palo Alto, CA (US); Lawrence Hui, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 12/193,508

(22) Filed: Aug. 18, 2008

Related U.S. Application Data

(63) Continuation of application No. 11/833,602, filed on Aug. 3, 2007, now Pat. No. 7,420,972, which is a continuation of application No. 10/219,799, filed on Aug. 14, 2002, now Pat. No. 7,263,099.

(51) Int. Cl.
*H04L 12/28* (2006.01)
(52) U.S. Cl. .................. 370/390; 370/351; 370/408
(58) Field of Classification Search .................. None
See application file for complete search history.

(56) References Cited

U.S. PATENT DOCUMENTS

| | | | |
|---|---|---|---|
| 5,179,551 A | | 1/1993 | Turner |
| 5,179,556 A | | 1/1993 | Turner |
| 5,402,415 A | | 3/1995 | Turner |
| 5,608,726 A | * | 3/1997 | Virgile .................. 370/401 |
| 5,778,187 A | | 7/1998 | Monteiro et al. |
| 5,898,687 A | * | 4/1999 | Harriman et al. ............ 370/390 |
| 6,167,427 A | * | 12/2000 | Rabinovich et al. ......... 709/201 |
| 6,314,525 B1 | | 11/2001 | Mahalingham et al. |
| 6,331,983 B1 | | 12/2001 | Haggerty et al. |
| 6,408,000 B1 | * | 6/2002 | Lamberg et al. ............ 370/390 |
| 6,434,622 B1 | | 8/2002 | Monteiro et al. |
| 6,553,028 B1 | | 4/2003 | Tang et al. |
| 6,778,532 B1 | | 8/2004 | Akahane et al. |
| 6,839,348 B2 | | 1/2005 | Tang et al. |

(Continued)

OTHER PUBLICATIONS

Jonathan S. Turner, "An Optimal Nonblocking Multicast Virtual Circuit Switch," Washington University, Department of Computer Science, WUCS-93-30, Mar. 23, 1994.

(Continued)

*Primary Examiner*—Phirin Sam
(74) *Attorney, Agent, or Firm*—Shumaker & Sieffert, P.A.

(57) ABSTRACT

Techniques are described to replicate multicast packets in accordance with a hierarchical data structure. For example, upon receiving a multicast packet, a packet-forwarding engine may communicate the packet to packet-forwarding engines corresponding to starting nodes of the hierarchical data structure. The packet-forwarding engines corresponding to starting nodes of the hierarchical data structure may replicate the multicast packet for local interface cards, and forward the replicated packets to the network. Furthermore, the packet-forwarding engines may replicate the packet for packet-forwarding engines corresponding to downstream nodes. In this manner, the packet replication process is distributed throughout the router decreasing the complexity of necessary replication hardware. Furthermore, the packet replication process is highly scalable resulting in a latency of one fabric hop when the number of packet-forwarding engines doubles. Also, when the hierarchical data structure has more than one starting node, the packet replication process is less susceptible to a single point failure.

19 Claims, 8 Drawing Sheets

U.S. PATENT DOCUMENTS

| | | | |
|---|---|---|---|
| 6,873,627 | B1 | 3/2005 | Miller et al. |
| 6,914,907 | B1 | 7/2005 | Bhardwaj et al. |
| 7,099,323 | B1 | 8/2006 | Doong et al. |
| 7,263,099 | B1 | 8/2007 | Woo et al. |
| 7,293,090 | B1 | 11/2007 | Saleh et al. |
| 7,420,972 | B1 | 9/2008 | Woo et al. |
| 2002/0001310 | A1 | 1/2002 | Mai et al. |
| 2002/0012327 | A1 | 1/2002 | Okada |
| 2002/0024956 | A1 | 2/2002 | Keller-Tuberg |
| 2002/0067730 | A1* | 6/2002 | Hinderks et al. ........ 370/395.52 |
| 2002/0150094 | A1* | 10/2002 | Cheng et al. ................. 370/389 |
| 2003/0099198 | A1* | 5/2003 | Kiremidjian et al. ..... 370/230.1 |
| 2003/0185209 | A1 | 10/2003 | Lee |
| 2004/0019696 | A1 | 1/2004 | Scott et al. |
| 2004/0081203 | A1 | 4/2004 | Sodder et al. |
| 2006/0146823 | A1 | 7/2006 | Ding |
| 2006/0203819 | A1 | 9/2006 | Farinacci et al. |
| 2006/0242311 | A1 | 10/2006 | Mai et al. |

OTHER PUBLICATIONS

Jonathan S. Turner, "A Proposed Bandwidth Management and Congestion Control Scheme for Multicast ATM Networks," Washington University, Computer and Communications Research Center, WUC-CRC-91-1, May 23, 1997.

Jonathan S. Turner, "Extending ATM Networks for Efficient Reliable Multicast," Washington University, Department of Computer Science, WUCS-96-16, Jan. 13, 1997.

"Internet Protocol (IP) Multicast," Cisco Systems Inc., 2000, ftp://ftpeng.cisco.com/ipmulticast/whitepapers/technology_overview/index.html.

Tony Rybczynski, "Propagating IP Multicast," Nortel Networks, 2000, http://www.nortelnetworks.com/solutions/financial/collateral/feb00_multicast.pdf.

Kevin Almeroth, "Deployment of IP Multicast in Campus Infrastructures," UC-Santa Barbara, http://www.cs.ucsb.edu/~almeroth/talks/12-ATL-01.ppt.

* cited by examiner

38 ↘ ROUTING TABLE

| MULTICAST GROUP | SA/DA | MULTICAST LIST |
|---|---|---|
| 0 | 123.56.45.8/224.225.10.10 | 0 |
| 1 | 155.48.2.130/224.225.11.11 | 0 |
| 2 | 58.112.1.2/224.225.136.136 | 1 |

(A)

40 ↘ MULTICASTING TABLE

| MULTICAST LIST | INTERFACES INCLUDED IN MULTICAST LIST |
|---|---|
| 0 | 0, 1, 2, 3, 5, 8, 10, 11, 12, 15, 20 |
| 1 | 0, 1, 4, 5, 7, 8, 10, 11, 15, 18 |
| 2 | 4, 6, 7, 9, 10, 11, 15, 16, 17, 18, 19, 21 |

MULTICAST PACKET REPLICATION

This application is a continuation of U.S. application Ser. No. 11/833,602, filed Aug. 3, 2007, which is a continuation of U.S. application Ser. No. 10/219,799, filed Aug. 14, 2002, now U.S. Pat. No. 7,263,099, the entire contents both of which are incorporated herein by reference.

TECHNICAL FIELD

The invention relates to computer networks and, more particularly, to multicast communications within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices within a network, referred to as routers, maintain tables of routing information that describe available routes through the network. Each route defines a path between two locations on the network. Upon receiving an incoming data packet, the router examines header information within the packet to identify the destination for the packet. Based on the header information, the router accesses the routing table, selects an appropriate route for the packet and forwards the packet accordingly.

Multicasting is a form of communication that allows a source device to send a single packet for distribution to multiple destination devices. With multicasting, the source device sends a single packet over the network to a router configured for multicasting. The router replicates the packet and forwards the copies to other multicast-enabled routers. The other routers, in turn, replicate the packet and repeat the forwarding process so that each of the destination devices receives a copy of the packet. The source device and the destination devices form a "multicast group." Multicast-enabled routers typically include hardware logic to replicate the multicast packets and forward them to the multicast group. Conventional multicast-enabled routers may perform packet replication in a centralized location. Centralized packet replication may result, however, in packet latency when numerous replications need to be performed and may be subject to single point failures.

SUMMARY

In general, the invention is directed to distributed replication of multicast packets. An inbound multicast packet carries a source/destination address pair that is associated with a particular multicast list. The multicast list may contain a list of interfaces, e.g., interface cards (IFCs), within a router. The interfaces in the multicast list are used in a common multicasting session. Each interface may be associated with a particular packet replicator, e.g., a packet-forwarding engine (PFE) within the router. Hence, the multicast list identifies, from the list of interfaces, a list of packet replicators involved in the multicasting session.

The packet replicators can be used to replicate multicast packets on a distributed basis. For example, each packet replicator may be configured to populate a hierarchical data structure, such as a binary tree data structure, based on the multicast list. Further, each packet replicator may replicate and forward incoming multicast packets in accordance with the hierarchical data structure. For example, a router may receive a multicast packet at one of the interfaces associated with a respective packet replicator. The packet replicator receiving the multicast packet sends the packet to another packet replicator that corresponds to a base node in the hierarchical data structure.

The packet replicator corresponding to the base node replicates the multicast packet, and forwards the replicated multicast packets to other packet replicators for further replication according to the hierarchical data structure. With a binary tree data structure, for example, a packet replicator replicates two packets, and sends them to two packet replicators at the next level of the tree. In this manner, a given packet replicator replicates the multicast packet for further replication by packet replicators at the next tier of the hierarchical data structure, providing a packet replication technique that distributes, i.e., de-centralizes, the replication task.

In one embodiment, a method comprises defining a hierarchical relationship of packet replicators distributed across multiple interfaces in a network router. The method further comprises replicating multicast packets in the packet replicators according to the hierarchical relationship. Replicating multicast packets according to the hierarchical relationship includes receiving a multicast packet from an interface, and generating a copy of the multicast packet for packet replicators that correspond to downstream nodes of the hierarchical relationship.

In another embodiment, a device comprises a set of router interfaces and a set of packet replicators. Each of the packet replicators is associated with one or more of the interfaces. Replication of multicast packets is distributed among the packet replicators according to a hierarchical relationship.

In another embodiment, a method comprises generating a hierarchical relationship for one-to-many communications for a set of interfaces within a network router. The method further includes replicating one-to-many communication packets using packet replicators associated with the interfaces in accordance with the hierarchical relationship.

In another embodiment, a method comprises receiving a multicast list of interface cards involved in a multicast session. The method further comprises deriving a list of packet-forwarding engines involved in a multicast session from the interface card multicast list. Each of the packet-forwarding engines is associated with one or more of the interface cards. The method includes generating a hierarchical data structure based on the packet-forwarding engine list. The method further includes replicating multicast packets within the packet-forwarding engines in accordance with the hierarchical data structure.

In another embodiment, a method comprises receiving a multicast list. The method further comprises determining a starting entry of the multicast list, populating a base node of a hierarchical data structure with one or a plurality of router interfaces corresponding to the determined starting entry of the multicast list, and populating the hierarchical data structure horizontally with ascending entries of the multicast list. In addition, the method involves replicating packets using packet replicators associated with the router interfaces according to the hierarchical data structure.

In another embodiment, a system comprises a source host that sends a multicast packet. The system may further comprise a plurality of destination hosts that receive a copy of the multicast packet. The system also includes a router that replicates multicast packets using packet replicators distributed across multiple interfaces in the router according to a hierarchical relationship.

In another embodiment, a computer-readable medium comprises instructions to cause a processor to define a hierarchical relationship of packet replicators distributed across multiple interfaces in a network router. The computer-readable medium further comprises instructions to cause a processor to replicate multicast packets in the packet replicators according to the hierarchical relationship.

The invention may provide one or more advantages. For example, the packet replication techniques described herein may reduce the complexity of hardware necessary for multicast packet replication. In particular, the packet replication task may be distributed across multiple packet replicators, which share the overall processing load associated with packet replication. The techniques also may promote a readily scalable multicast packet replication scheme. For example, doubling in the number of packet replicators that need to replicate the packet may only lead to an increased latency of an additional switch hop. The techniques may further prevent single point failure of multicast packet replication, e.g., by relieving the replication load at concentrated points along the network.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 4A and 4B illustrate exemplary data structures maintained by a routing engine.

DETAILED DESCRIPTION

Figure 1:
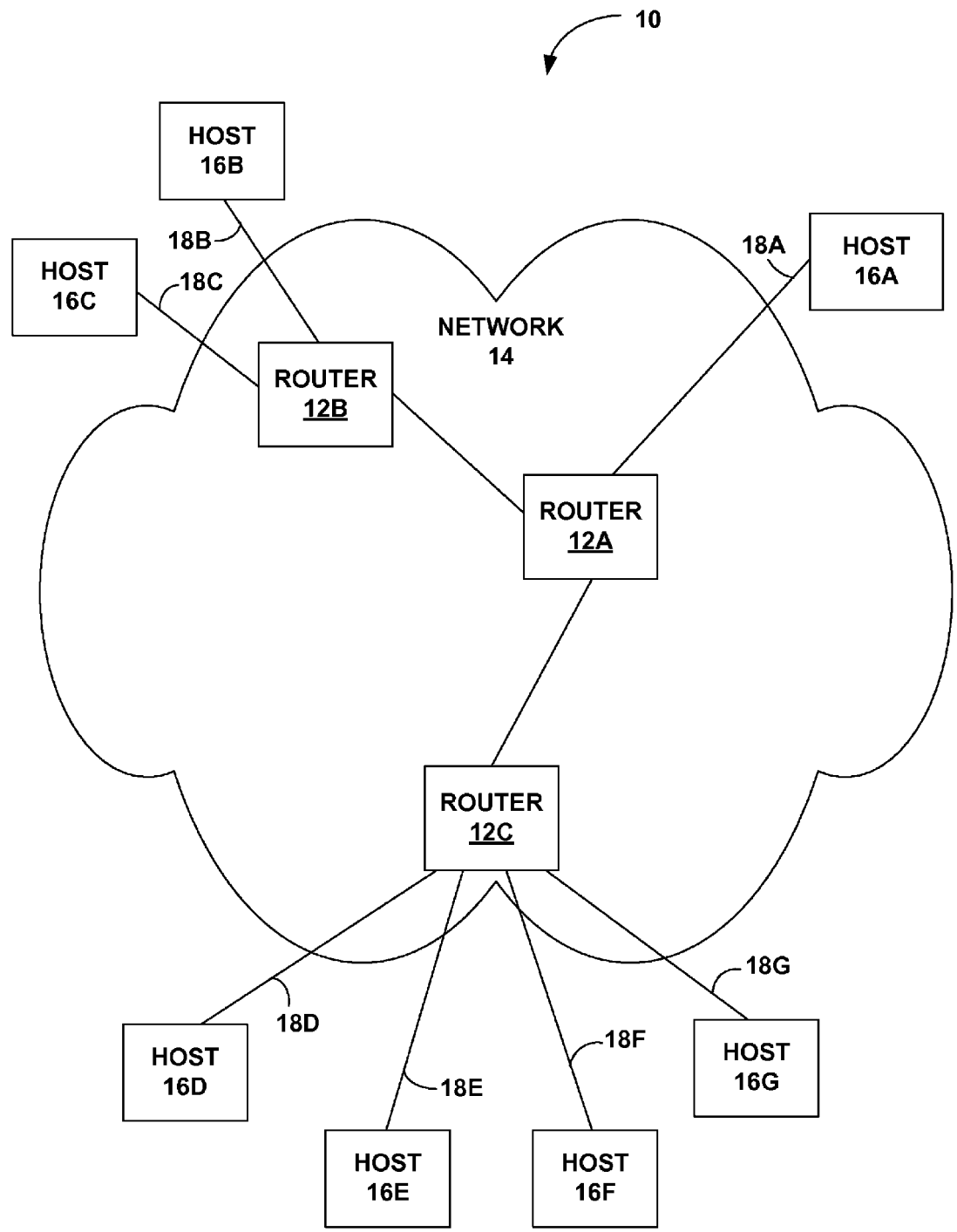
FIG. 1 is a block diagram illustrating a computer network in which routers support a multicasting packet replication scheme consistent with the principles of the invention.

FIG. 1 is a block diagram illustrating a computer network 10 that supports a multicasting packet replication scheme consistent with the principles of the invention. Computer network 10 includes a network 14 that may be accessed by hosts 16A to 16G (collectively hosts 16) via one of links 18A to 18G (collectively links 18). Each of hosts 16 represents an entity, such as an individual or an organization, that accesses network 14 to communicate with other hosts connected to network 14. Links 18 may be, for example, fast Ethernet, ATM, Sonet or other network connections.

Network 14 further includes routers 12A to 12C (collectively routers 12). Routers 12 support one-to-many communications, such as multicasting or broadcasting, using a protocol that allows one of hosts 16 (referred to as a source host) to send a single packet, and multiple hosts 16 (referred to as destination hosts) to receive the packet. A source host may use multicasting to distribute streaming data such as video, audio, data, or other information. In addition, a source host may use multicasting to distribute group email, software updates, or the like.

A multicasting group may be established using a protocol such as Internet Group Management Protocol (IGMP) or the like. Multicasting groups may include a source host and a plurality of destination hosts. To register for a multicast group, each destination host sends an IGMP control packet, e.g., a Host Membership Report, to a local router 12 indicating interest in joining a particular multicast group. The multicast group is typically identified by a multicast address that forms the destination address in the source/destination address pair of the multicast packet. For example, with reference to the example of FIG. 1, a multicast group may be established to include a source host, 16A, and a set of destination hosts, 16B, 16C, 16D, and 16F. In general, source host 16A may send a single multicast packet, for each packet in the multicast stream, across network 14.

Destination hosts 16B, 16C, 16D, and 16F receive packets identical to the packets sent by host 16A. In particular, one or more routers 12 within network 14 replicate the individual packets sent by source host 16A. For example, sender 16A may send a multicast packet to router 12A. Router 12A may identify the packet as a multicast packet, and determine individual routers 12 to which the packet should be forwarded. In this case, both router 12B and 12C must receive a copy of the multicast packet. Router 12A replicates the packet, and forwards to each router 12B and router 12C a packet identical to the multicast packet sent by source host 16A. Router 12C receives the packet sent by router 12A, and identifies the packet as a multicast packet. Router 12C determines which of hosts 16D to 16G are registered as destination hosts to receive the packet. Router 12C replicates the packet and sends a copy to host 16D and 16F, assuming that hosts 16D and 16F are the only two hosts included in the multicast group for purposes of this example. Router 12B distributes the packets to destination hosts 16B and 16C in the same way that router 12C distributes the packets to destination hosts 16D and 16F.

Routers 12 replicate multicast packets in order to distribute identical copies of the packets to other multicasting-enabled routers 12, or to destination hosts of a multicasting group. As described in detail herein, routers 12 replicate multicast packets using packet replicators, such as packet-forwarding engines (PFEs), associated with a set of interfaces, referred to as interface cards (IFCs). For example, one of routers 12 may include a first packet replicator associated with one or more IFCs, e.g., IFCs 1-4, and a second packet replicator associated with one or more IFCs, e.g., IFCs 5-8. In this manner, IFCs 1-4 may be considered local to the first packet replicator and IFCs 5-8 may be considered local to the second packet replicator. The number of IFCs managed by each packet replicator may vary.

An inbound packet has a source/destination address pair that is associated with a particular multicast list. The multicast list may contain a list of IFCs involved in a multicast session. The packet replicators can be used to replicate multicast packets on a distributed basis in accordance with the principles of the invention. More particularly, router 12 may define a hierarchical relationship of packet replicators across multiple interfaces. For example, each packet replicator may be configured to populate, i.e. correspond to an entry in, a hierarchical data structure, such as a binary tree data structure, based on the multicast list. Further, each packet replicator may replicate and forward incoming multicast packets in accordance with the hierarchical data structure. For example, a router 12 may receive a multicast packet at one of the IFCs associated with a respective packet replicator. The packet replicator receiving the multicast packet sends the packet to another packet replicator that corresponds to a base node in the hierarchical data structure.

The packet replicator corresponding to the base node replicates the multicast packet, and forwards the replicated multicast packets to other packet replicators for further replication according to the hierarchical data structure. With a binary tree data structure, for example, a packet replicator replicates two packets, and sends them to two packet replicators at the next level of the tree. In this manner, a given packet replicator replicates the multicast packet for further replication by packet replicators at the next tier of the hierarchical data structure, providing a packet replication technique that distributes, i.e., de-centralizes, the replication task.

Figure 2:
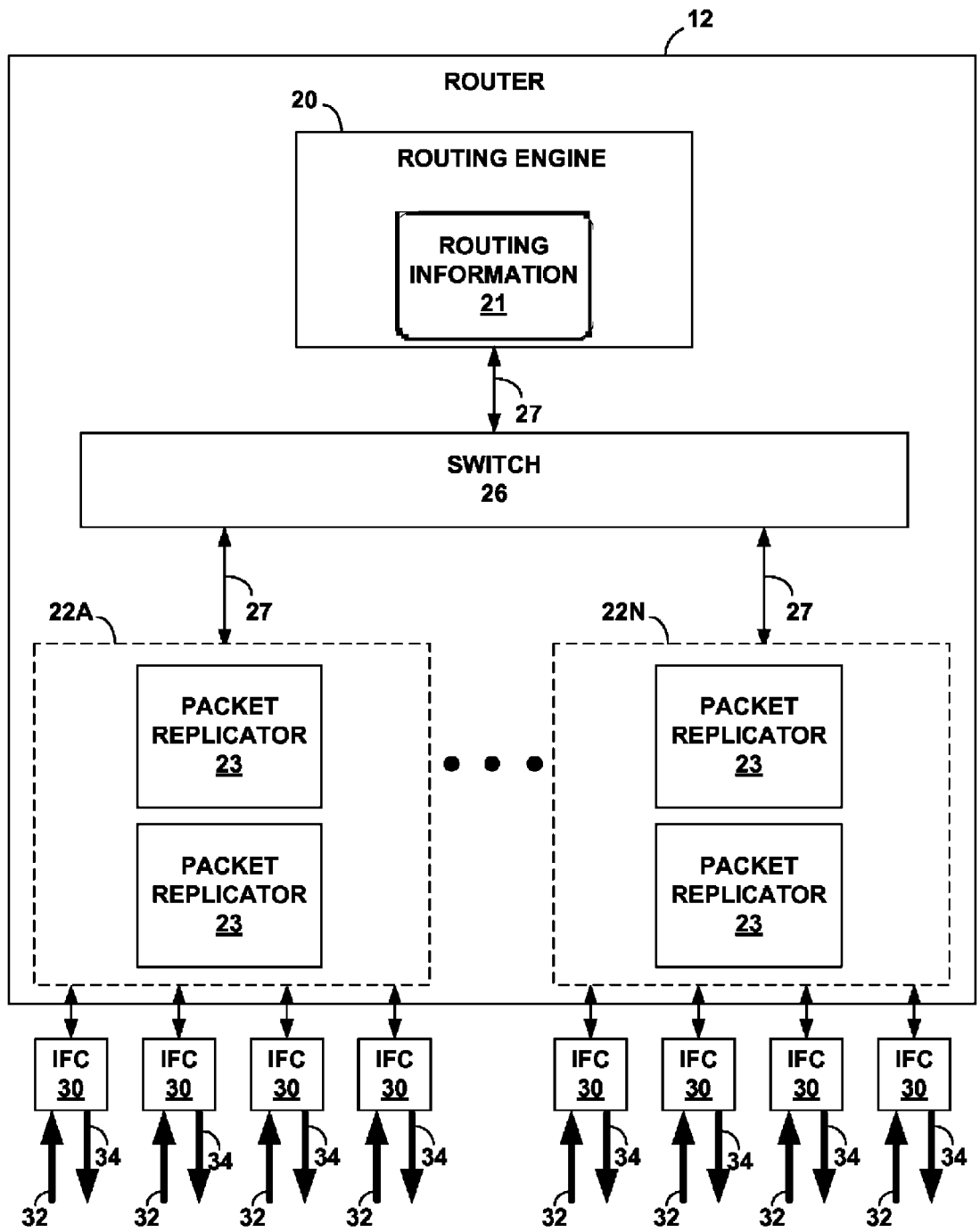
FIG. 2 is a block diagram illustrating an exemplary router that replicates multicast packets in accordance with the principles of the invention.

FIG. 2 is a block diagram illustrating an exemplary router 12 that replicates multicast packets in accordance with the principles of the invention. Router 12 includes a routing engine 20 that is responsible for maintaining routing information 21. Routing information 21 describes the topology of network 14 and, in particular, routes through network 14. Routing information 21 may include, for example, route data that describes various routes within network 14, and corresponding next hop data indicating appropriate neighboring devices within network 12 for each of the routes. Routing engine 20 periodically updates routing information 21 to accurately reflect the topology of network 14.

Routing engine 20 may be coupled to one or more interface managers 22A to 22N (collectively interface managers 22) via a switch 26. Each interface manager 22 may comprise a set of one or more interface cards (IFCs) 30 for receiving and sending data packets via network links 32 and 34, respectively. IFCs 30 are typically coupled to network links 32, 34 via a number of interface ports. Switch 26 communicates data packets between routing engine 20 and interface managers 23, and between interface managers 23 via switch 26 and links 27. Switch 26 may comprise, for example, a switch fabric, a configurable network switch or hub, and the like. Links 27 may comprise any form of communication path, such as electrical paths within an integrated circuit, external data busses, optical links, network connections, wireless connections, and the like.

Interface managers 22 may further comprise one or more packet replicators 23. Each packet replicator 23 may be associated with a subset of IFCs 30. Furthermore, each packet replicator 23 may store a hierarchical data structure, such as a binary tree, that represents the hierarchical relationship of packet replicators 23 distributed across multiple interfaces of router 12. The hierarchical data structure guides a packet replication technique in accordance with the principles of the invention.

In operation, routing engine 20 may send a multicast list indicating IFCs 30 involved in a multicast session to each packet replicator 23. The multicast list may be derived from a list of destination hosts 18 subscribing to a particular multicast and, in turn, a list of IFCs 30 and associated packet replicators 23 connected to links 34 that serve the destination hosts. Thus, packet replicators 23 derive, from the IFC multicast list, a list of packet replicators 23 involved in the multicast session. Packet replicators 23 populate a hierarchical data structure 36 with the packet replicator multicast list derived from the IFC multicast list. In this manner, router 12 defines a hierarchical relationship of packet replicators across multiple interfaces. Each packet replicator 23 uses an algorithm to select a starting entry number in the list of packet replicators 23 from which to begin populating the hierarchical data structure. By using the same algorithm, each packet replicator 23 generates substantially the same hierarchical data structure.

Packet replication for multicasting communication is performed in accordance with the hierarchical data structure. For example, upon receiving an incoming packet at one of IFCs 30, a respective packet replicator 23 communicates the packet, via switch 26, to another packet replicator 23 corresponding to a base node in the hierarchical data structure. The packet replicator 23 that corresponds to the base node of the hierarchical data structure replicates the packet for any local IFCs 30 involved in the multicast session, and communicates the packet to appropriate IFCs 30 for forwarding to network 14 via network link 34. Furthermore, packet replicator 23 replicates the multicast packet for a subset of additional packet replicators 23 on the next tier of the hierarchical data structure, and communicates the replicated packets to the respective packet replicators 23 via switch 26. Packet replicators 23 of each tier of the hierarchical data structure perform similar operations until all packet replicators 23 involved in the multicast communication session have copied the multicast packet.

Figure 3:
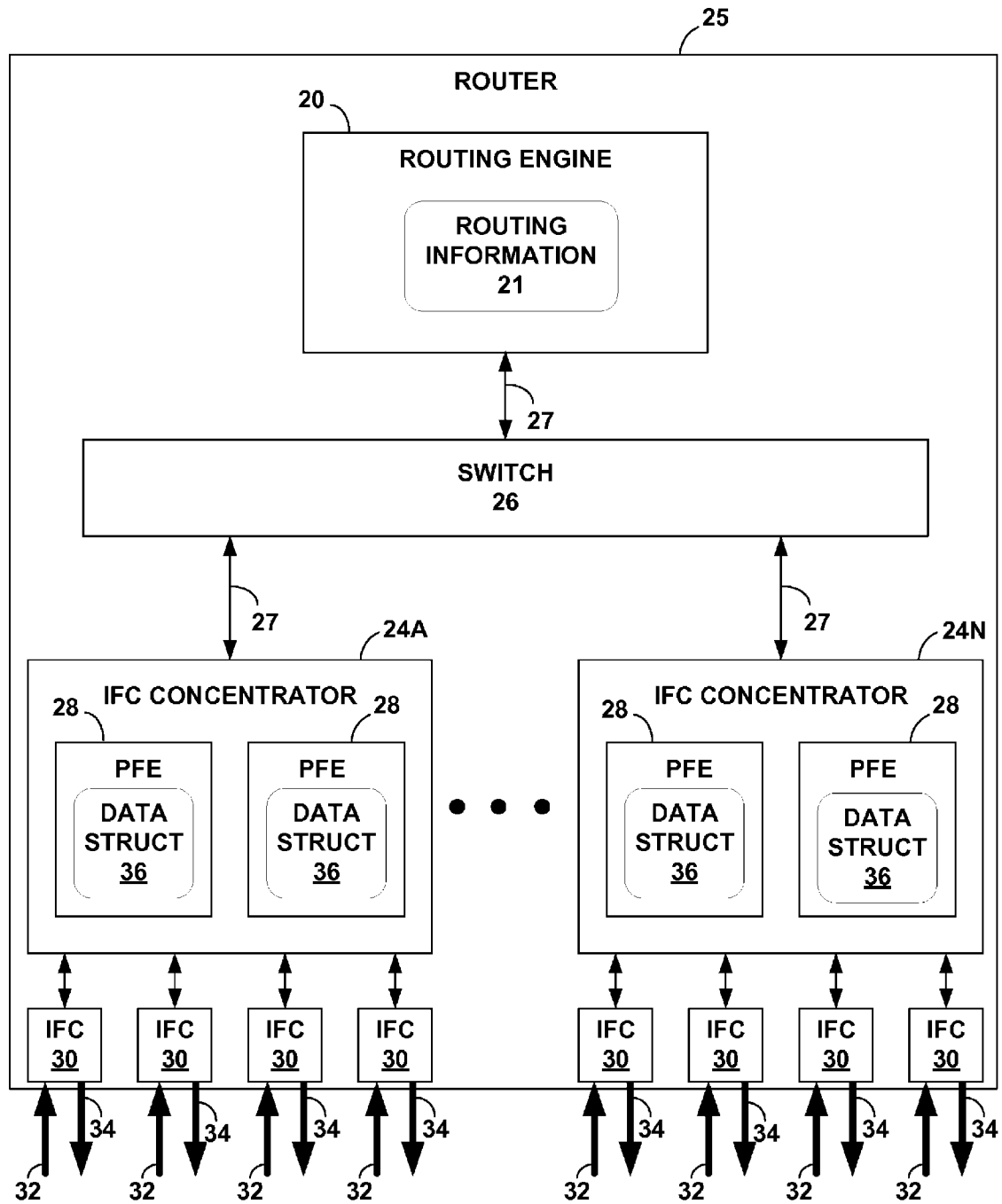
FIG. 3 is a block diagram illustrating another exemplary router that replicates multicast packets using PFEs as packet replicators.

FIG. 3 is a block diagram illustrating another exemplary router 25 that replicates multicast packets using packet-forwarding engines (PFEs) 28 as packet replicators. Router 25 includes a routing engine 20 that is responsible for maintaining routing information 21. Routing engine 20 may be coupled to one or more IFC concentrators 24A to 24N (collectively IFC concentrators 24) via a switch 26. IFC concentrators 24 receive a plurality of IFCs 30. IFC concentrators 24 may direct incoming and outgoing packets to particular IFCs 30 within router 25. IFC concentrators 24 may further divide incoming data packets into memory blocks (cells) and reassemble the cells into data packets for transmission outside of router 25. Switch 26 communicates data packets between routing engine 20 and IFC concentrators 24, and between IFC concentrators 24 via switch 26 and links 27.

Each IFC concentrator 24 may comprise a set of one or more interface cards (IFCs) 30 for receiving and sending data packets via network links 32 and 34, respectively. IFC concentrators 24 may further comprise one or more packet-forwarding engines (PFEs) 28. In the example illustrated in FIG. 3, each PFE 28 handles packet forwarding for a subset of IFCs 30. In the case of a single PFE 28 residing within IFC concentrator 24, all IFCs 30 of the respective IFC concentrator 24 are coupled to the single PFE 28. Alternatively, multiple PFEs 28 may reside within IFC concentrators 24, and be coupled to subsets of IFCs 30 via IFC concentrator 24. As a further alternative, PFEs 28 may reside outside of IFC concentrators 24 and be coupled to remotely manage IFCs 30.

Each PFE 28 stores forwarding information from routing engine 20. The forwarding information may associate, for example, network destination hosts with specific next hops and corresponding interface ports of IFCs 30. PFEs 28 may further store a hierarchical data structure (DATA STRUCT) 36 that defines a hierarchical relationship of PFEs distributed across multiple interfaces of router 25. Hierarchical data structure 36 may be a tree structure, such as a binary tree, that guides a packet replication technique in accordance with the principles of the invention.

In operation, routing engine 20 may send a multicast list indicating IFCs 30 involved in a multicast session to each PFE 28. The multicast list may be derived from a list of destination hosts 18 subscribing to a particular multicast and, in turn, a list of IFCs 30 and associated PFEs 28 connected to links 34 that serve the destination hosts. Thus, PFEs 28 derive, from the IFC multicast list, a list of PFEs 28 involved in the multicast session. PFEs 28 populate hierarchical data structure 36 with the PFE multicasting list derived from the IFC multicast list. In this manner, router 25 defines a hierarchical relationship of packet replicators across multiple interfaces. Each PFE 28 uses an algorithm to select a starting entry number in the list of PFEs 28 from which to begin populating hierarchical data structure 36. By using the same algorithm, each PFE 28 generates substantially the same hierarchical data structure 36.

Packet replication for multicasting communication is performed in accordance with hierarchical data structure 36. For example, upon receiving an incoming packet at one of IFCs 30, a respective PFE 28 communicates the packet, via switch 26, to another PFE 28 corresponding to a base node in hierarchical data structure 36. The PFE 28 that corresponds to the base node of hierarchical data structure 36 replicates the packet for any local IFCs 30 involved in the multicast session, and communicates the packet to appropriate IFCs 30 for forwarding to network 14 via network link 34. Furthermore, PFE 28 replicates the multicast packet for a subset of additional PFEs 28 on the next tier of hierarchical data structure 36, and communicates the replicated packets to the respective PFEs 28 via switch 26. PFEs 28 of each tier of hierarchical data structure 36 perform similar operations until all PFEs 28 involved in the multicast communication session have copied the multicast packet.

FIGS. 4A and 4B illustrate exemplary data structures 38, 40 maintained by routing engine 20. In particular, FIG. 4A illustrates a routing information data structure 38, and FIG. 4B illustrates a multicasting data structure 40. In the example of FIG. 4A, routing information data structure 38 is represented as a table in which each row represents a particular multicast group. For each multicast group, routing information data structure 38 includes a multicast group number that is associated with a particular source/destination address pair (SA/DA). Routing information data structure 38 may further include a multicast list index number, which is also associated with a respective multicast group number. Two multicast groups may correspond to the same multicast list index number. For example, two multicast groups may need to forward replicated multicast packets using the same IFCs 30. The data of FIG. 4A is illustrated for exemplary purposes, and may be subject to variation. For example, routing information data structure 38 may further include next hop data, interface port number data, and the like.

In the example of FIG. 4B, multicasting data structure 40 is represented as a table in which each row represents a particular multicast interface list, i.e., a list of IFCs 30. In particular, for each multicast interface list, multicasting data structure 40 includes a multicast list index number and a list of IFCs 30 involved in a multicast session. Alternatively, the list may set forth the identities of packet replicators 23 associated with IFCs 30, and thereby involved in a multicast session. For example, the list may set forth the identities of PFEs 28 involved in the multicast session. Multicasting data structure 40 may also include both a list of router IFCs 30 and packet replicators 23, such as PFEs 28, included in a multicast session. Router 20 sends a portion of the information contained in data structures 38 and 40 to each packet replicator 23. In this manner, packet replicators 23 may contain data structures similar to the ones shown in FIG. 4.

Figure 5:
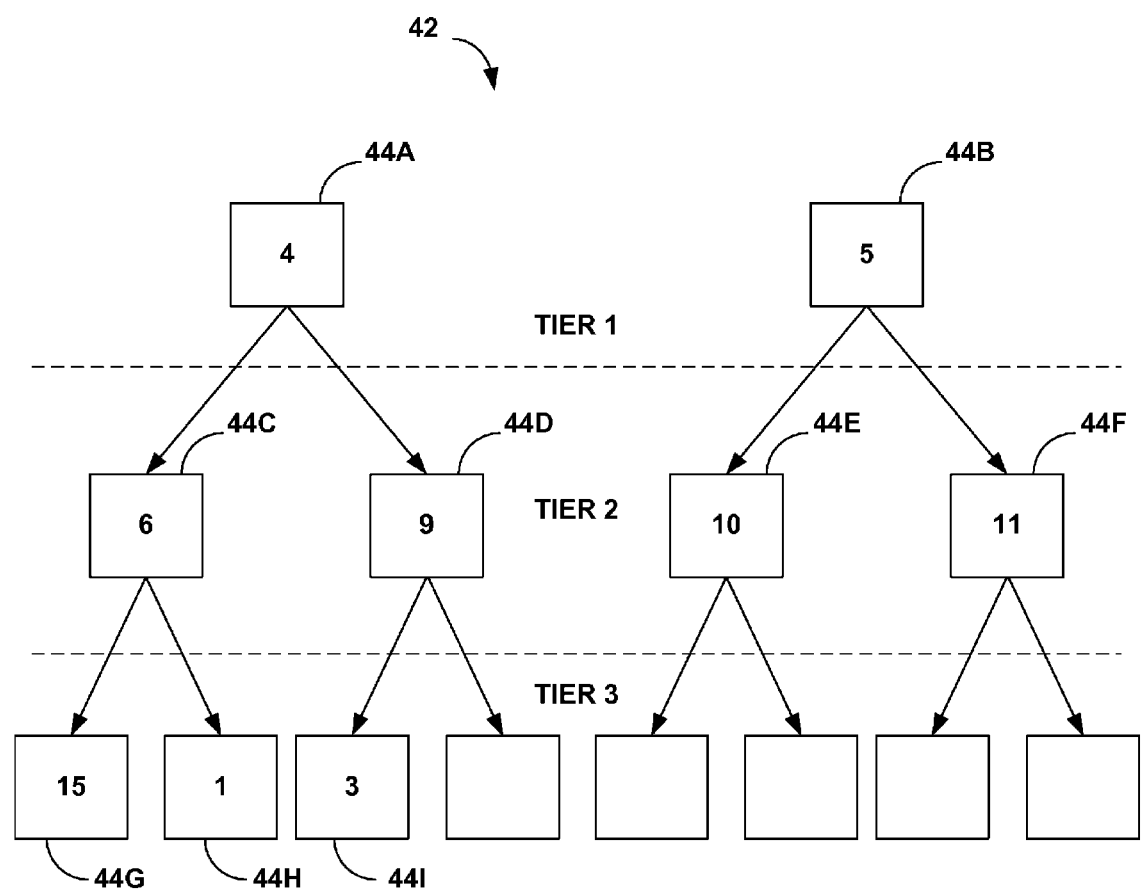
FIG. 5 is a block diagram illustrating an exemplary hierarchical data structure defining a hierarchical relationship of packet replicators across multiple interfaces.

FIG. 5 is a block diagram illustrating an exemplary hierarchical data structure 42 defining a hierarchical relationship of packet replicators 23 across multiple interfaces. Each packet replicator 23 may maintain hierarchical data structure 42 for performance of packet replication in support of a multicast session. For example, hierarchical data structure 36 maintained by PFEs 28 of router 25 (FIG. 3) may be similar to hierarchical data structure 42. In the example of FIG. 5, hierarchical data structure 42 is a dual binary tree structure. Each node 44 in the dual binary tree corresponds to a packet replicator 23, such as PFE 28 (FIG. 3), involved in a multicast session. In this manner, packet replicators 23 involved in a multicast session populate the dual binary tree. The dual binary tree illustrated in FIG. 4 includes three tiers of nodes 44, although the number of tiers will depend on the number of packet replicators 23 included in the multicast session.

Upon receiving an IFC multicast list, each packet replicator 23 derives a list of packet replicators 23 involved in the multicast session. To avoid continually starting the packet replication at the same packet replicator 23, an algorithm may be provided to randomize the starting entry number of the packet replicator list, in turn randomizing the packet replicator identities for the base nodes 44A and 44B. One example algorithm may be configured to start at the Kth entry of the packet replicator list, where K is the remainder of the multicast list index number from multicasting data structure 40 of FIG. 4 divided by the number of packet replicators 23 in the list. For example, multicast list index number twenty-one may have a packet replicator list with nine packet replicator identification numbers (1, 3, 4, 5, 6, 9, 10, 11, 15). Therefore, base node 44A would correspond to the third entry (21/9=2 remainder 3) of the packet replicator list, corresponding to packet replicator 4. The rest of the entries in the packet replicator list may populate the dual binary tree horizontally from the first tier downward. For instance, node 44B corresponds to packet replicator 5, node 44C corresponds to packet replicator 6, and so on. Upon reaching the end of the packet replicator list, the next node 44 may correspond to the packet replicators at the beginning of the list, shown by nodes 44H and 44I.

Router 25 replicates packets in accordance with hierarchical data structure 42. Upon receiving an inbound multicast packet at one of IFCs 30, the corresponding packet replicator 23 replicates the packet and communicates it to the packet replicators 23 corresponding to base nodes 44A and 44B, i.e., packet replicators 4 and 5 in the example of FIG. 5. Packet replicators 4 and 5 then replicate the multicast packet for any local IFCs 30. Further, packet replicators 23 replicate the multicast packet for transmission to packet replicators 23 that correspond to downstream nodes 44. A switch, similar to switch 26 (FIG. 2), can be used to handle communications between packet replicators 23. In the exemplary embodiment of FIG. 5, packet replicator 4 replicates the multicast packet for packet replicators 6 and 9 corresponding to downstream nodes 44C and 44D, respectively. The replication process proceeds to extend down the dual binary tree until each packet replicator 23 corresponding to nodes 44 of the tree receives a copy of the multicast packet. Then, packet replicators 23 send the replicated packets along respective links 34 to fulfill the multicast subscription requirements of the destination hosts 16 in the multicast group.

Advantageously, the dual binary tree structure of FIG. 5 may be less susceptible to a single point failure. For example, when one packet replicator 23, such as PFE 28 (FIG. 3), fails to successfully replicate a packet, only the downstream packet replicators 23 on that branch are affected. Further, the dual binary tree structure is readily scalable to better accommodate large-scale replication tasks. Thus, the depth of the dual binary tree structure may extend substantially beyond the three tiers shown in FIG. 5. Each time the number of packet replicators 23 doubles, the latency of the replication process only increases by an additional fabric hop.

The hierarchical data structure shown in FIG. 5 is for exemplary purposes, and may be readily varied. For example, hierarchical data structure 42 may have only a single base node 40 or more than two base nodes 40. Further, hierarchical data structure 42 may not be balanced. For instance, each of nodes 40 may have a different number of downstream nodes 40. Therefore, the dual binary tree structure 42 of FIG. 5 should not be considered limiting of the distributed packet replication techniques described herein.

Figure 6:
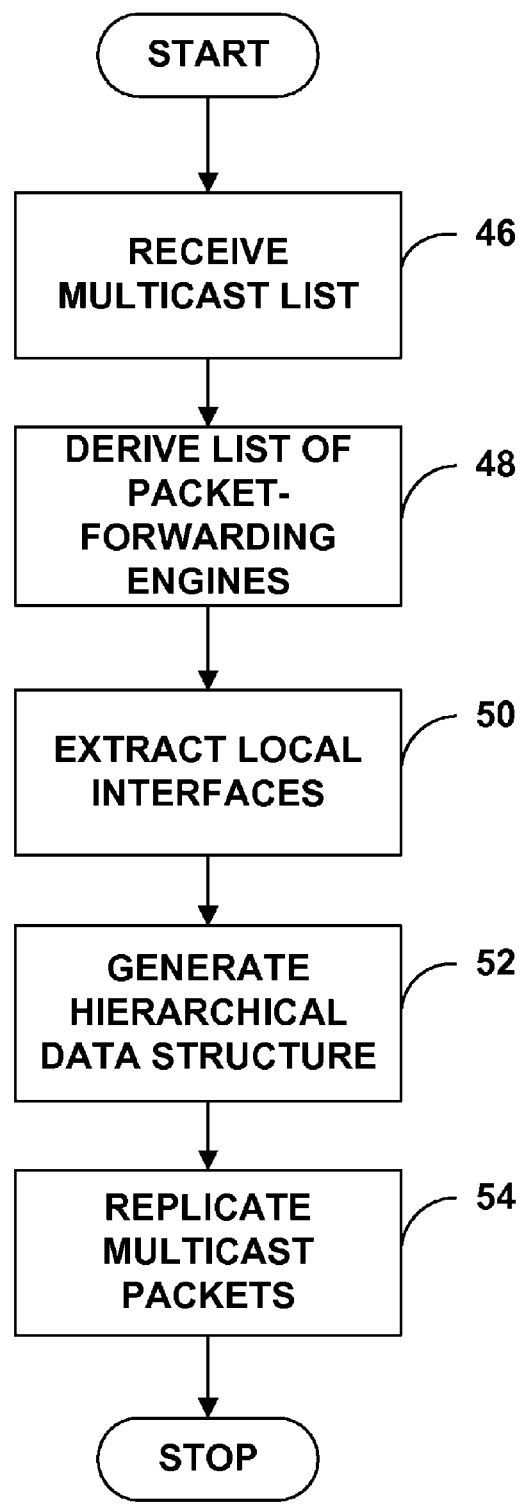
FIG. 6 is a flowchart illustrating an example mode of operation of a packet replicator, such as a PFE.

FIG. 6 is a flowchart illustrating an example mode of operation of a packet replicator 23, such as PFE 28 (FIG. 3). Packet replicator 23 receives a multicast list from routing engine 20 (46). The multicast list from routing engine 20 may be a list of IFCs 30 involved in a multicast session, i.e., IFCs 30 coupled to links 34 over which multicast packets are sent to destination hosts 16. Alternatively, routing engine 20 may provide a multicast list of packet replicators 23 included in a multicast communication session. When the multicast list is a list of included IFCs 30, packet replicators 23 may derive from the list a set of packet replicators 23 involved in a multicast communication session (48). For example, consider a router, such as router 25 (FIG. 3) that has three PFEs 28. In this example, further assume that PFE 1 couples to IFCs 1 and 2, PFE 2 couples to IFCs 3 and 4, and PFE 3 couples to IFCs 5 and 6. Each of the PFEs 28 receives a multicast list indicating that IFCs 3, 4, and 6 are included in a multicast communication session. From the IFC multicast list, PFEs 28 may derive a list of PFEs 28 involved in the multicast session. The list would only include PFE 2 and 3 since none of the IFCs 30 coupled to PFE 1 are included in the IFC multicast list.

In addition, each of packet replicators 23 may extract from the list corresponding local IFCs 30 included in the multicast session (50). For example, packet replicators 23 may extract from the IFC multicast list a list of IFCs 30 that packet replicator 23 manages and which are included in the multicast session. In this manner, each of packet replicators 23 may be aware of which local IFCs 30, as well as which packet replicators 23, are involved in a multicast session.

Packet replicators 23 generate a hierarchical data structure 42 from the multicast list as described above in FIG. 5 (52). Each packet replicator 23 may use the same algorithm to choose the starting entry, and populate hierarchical data structure 42 in the same fashion. Therefore, hierarchical data structure 42 generated by each of packet replicators 23 may be substantially the same. Packet replicators 23, such as PFEs 28 (FIG. 3) replicate packets in accordance with the hierarchical data structure 42. In this manner, each of packet replicators 23 may be responsible for replicating the multicast packet for local IFCs, as well as for packet replicators 23 corresponding to downstream nodes 40. However, no packet replicator 23 or other processing circuitry within router 12 bears the entire burden of packet replication.

Figure 7:
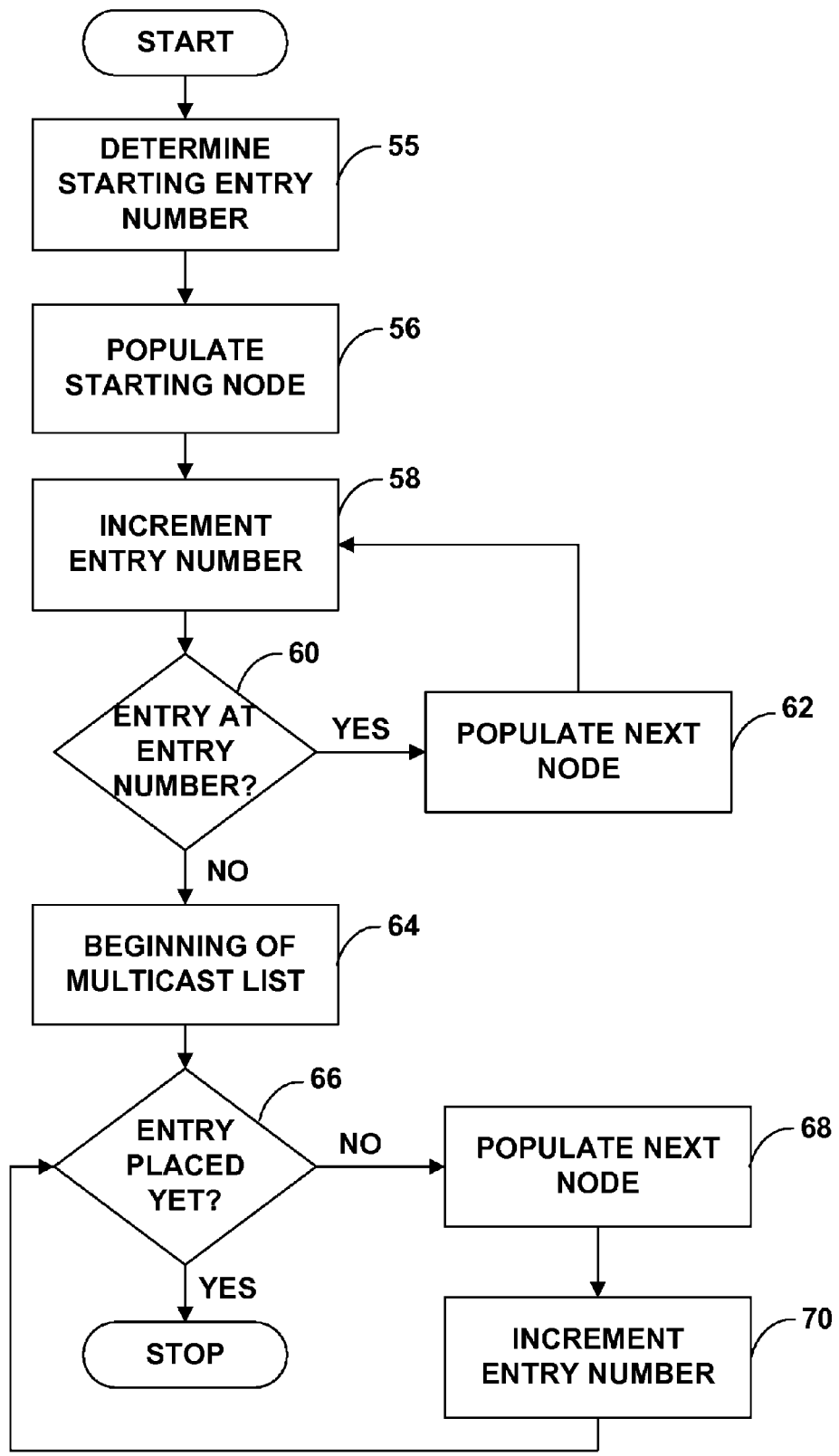
FIG. 7 is a flowchart illustrating generation of a hierarchical relationship of packet replicators based on a multicast list of packet replicators involved in a multicast session.

FIG. 7 is a flowchart illustrating generation of a hierarchical relationship, such as that of hierarchical data structure 42 of FIG. 4, of packet replicators based on a multicast list of packet replicators 23 involved in a multicast session. Upon receiving or deriving the packet replicator multicast list, each packet replicator 23 calculates a starting entry number, e.g., using a random function, to avoid continually starting the packet replication at the same packet replicator 23 (55). Packet replicators 23 may calculate the starting entry number using an algorithm that is common to all packet replicators 23. The algorithm, for example, may be similar to the one described above for populating the dual binary tree of FIG. 5.

Packet replicators 23 populate the base node of hierarchical data structure 42 with an entry indexed at the calculated starting node entry (56). In this manner, the base node corresponds to the packet replicator 23 located at the starting entry number. Packet replicators 23 may increment the starting entry number by one and may search the packet replicator multicast list for an entry at the new entry number (58, 60). When there is an entry indexed at the new entry number, the entry populates the next node of hierarchical data structure 42 (62). The next node of hierarchical data structure 42 may be on the same tier as the previous node. However, if there are no more nodes on the same tier as the previous node, the next node may be on the tier directly below the full tier.

When there is no entry indexed to the new entry number, packet replicators 23 go to the first index of the packet replicator multicast list and determine whether or not the entry indexed at that point has already been placed into hierarchical data structure 42 (64, 66). When the entry has not been placed into hierarchical data structure 42, packet replicators 23 populate the next node of data structure 42 with the entry indexed at the beginning of the multicast list (68). The entry number is incremented by one and the next entry of the multicast list is checked (70, 66).

When the entry number reaches an entry that has already been placed in hierarchical data structure 42, all of the entries of the multicast list have been placed into hierarchical data structure 42. Further, each of packet replicators 23 has substantially identical hierarchical data structures 42. Packet replicators 23 begin to replicate multicast packets of the corresponding multicast session in accordance with hierarchical data structure 42.

Figure 8:
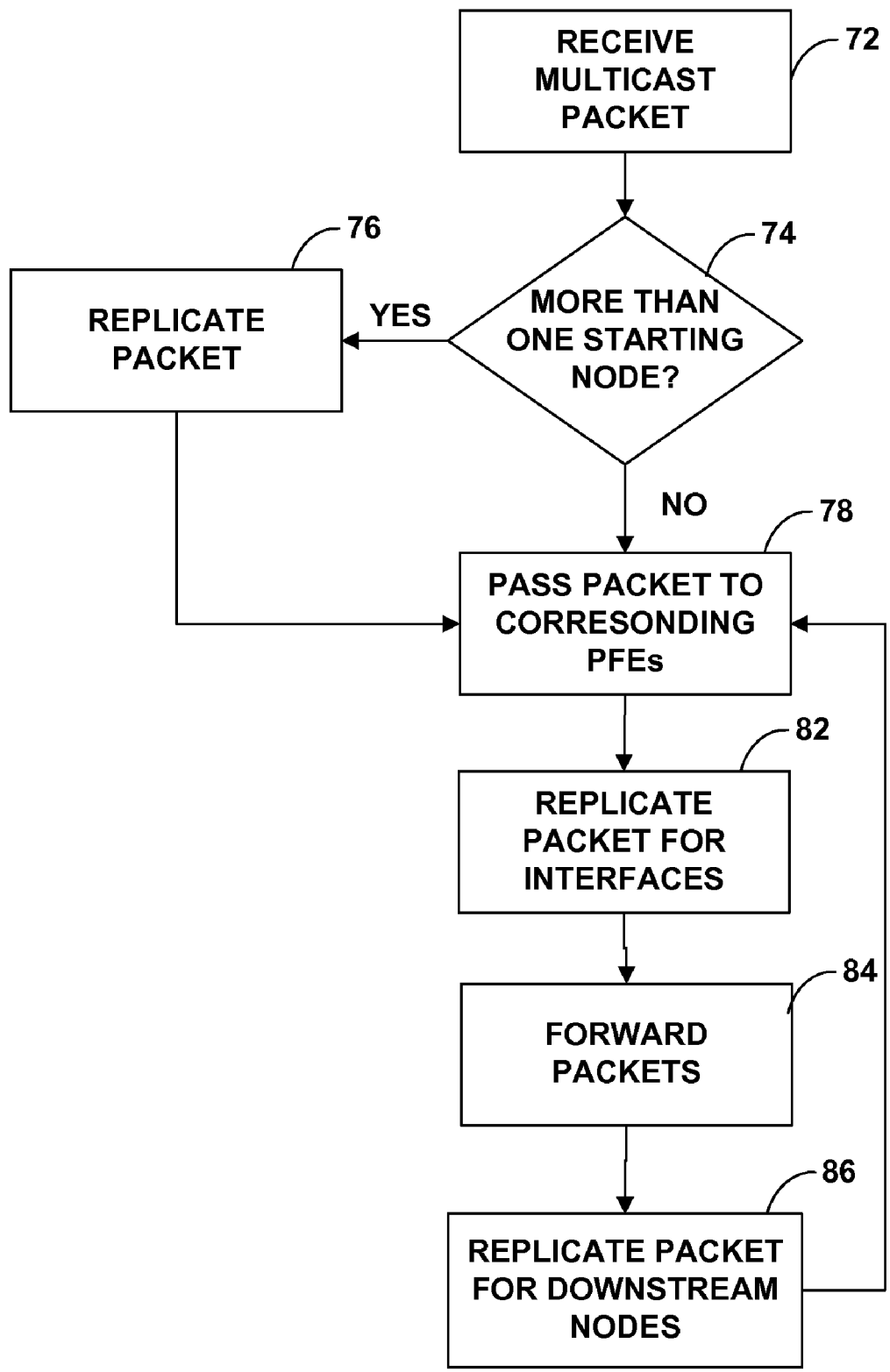
FIG. 8 is a flowchart illustrating an example mode of operation of a packet replicator in replicating packets according to a hierarchical relationship.

FIG. 8 is a flowchart illustrating an example mode of operation of a packet replicator 23 in replicating packets according to a hierarchical relationship, such as hierarchical data structure 36 (FIG. 3). Router 12 receives a multicast packet from network 14 via one of IFCs 30 (72). Packet replicator 23 managing IFC 30 determines whether hierarchical data structure 36 has more than one base node (74). When hierarchical data structure 36 does have more than one base node, packet replicator 23 may replicate the packet for each packet replicator 23 corresponding to base nodes (76). Packet replicator 23 communicates the replicated packets to the packet replicators 23 corresponding to the base nodes (78). When there is only one base node, no replication is necessary and packet replicator 23 forwards the multicast packet to packet replicator 23 corresponding to the base node. When the packet arrives directly at PFE 28 corresponding to the base node, packet replication may begin immediately. However, if there is more than one base node the receiving packet replicator 23 duplicates the packet and sends it to packet replicators 23 corresponding to other base nodes.

Packet replicators 23 corresponding to base nodes replicate the multicast packet for any local IFCs 30 that are involved in the multicast session (82). For instance, packet replicator 23 may access the derived list of local IFCs 30. Packet replicator 23 forwards the copy of the multicast packet to network 14 via outbound network link 34 (84). Furthermore, packet replicator 23 replicates the multicast packet for the packet replicators 23 corresponding to downstream nodes, and passes the packets to the corresponding packet replicators 23 (86). The replication process continues until each of packet replicators 23 of the multicast list receives a duplicate of the multicast packet.

Various embodiments of the invention have been described. These and other embodiments are within the scope of the following claims.

The invention claimed is:

1. A method of replicating multicast packets within a network router having a plurality of interfaces, the method comprising:
    defining a hierarchical relationship for a plurality of packet replicators located within the network router, wherein each of the plurality of packet replicators is associated with a set of one or more of the interfaces of the network router;
    receiving a multicast packet via one of the interfaces of the network router;
    performing de-centralized replication by replicating the multicast packet using the packet replicators of the network router to produce a plurality of replicated multicast packets, wherein the de-centralized replication is performed in accordance with the hierarchical relationship of the packet replicators; and
    outputting the replicated multicast packets on a plurality of the interfaces of the network router.

2. The method of claim 1, wherein performing de-centralized replication includes each of the packet replicators:
    generating copies of the multicast packet for any downstream packet replicators of the network router corresponding to the hierarchical relationship for replication; and
    forwarding the copies of the multicast packet to the downstream packet replicators.

3. The method of claim 2, wherein performing de-centralized replication includes each of the packet replicators:
    generating copies of the multicast packet for the set of interfaces with which the packet replicator is associated; and
    outputting the replicated multicast packets on the interfaces of the set of interfaces with which the packet replicator is associated.

4. The method of claim 1, further comprising:
    associating the hierarchical relationship for replication with a corresponding multicast list; and
    storing the hierarchical relationship and the association with the corresponding multicast list within each of the plurality of packet replicators.

5. The method of claim 4, further comprising:
    associating a source address and destination address pair of the received multicast packet with the multicast list corresponding with the hierarchical relationship for replication;
    accessing the hierarchical relationship associated with the multicast list; and
    communicating the multicast packet to at least one packet replicator corresponding to a top of the hierarchical relationship.

6. The method of claim 5, wherein the hierarchical relationship includes more than one packet replicator corresponding to the top of the hierarchical relationship, further comprising:
    generating, with the one of the plurality of packet replicators associated with the interface that received the multicast packet, copies of the multicast packet for each of the packet replicators corresponding to the top of the hierarchical relationship; and
    communicating the copies of the multicast packet to the packet replicators corresponding to the top of the hierarchical relationship.

7. The method of claim 1, wherein defining the hierarchical relationship comprises defining the hierarchical relationship within each of the plurality of packet replicators such that each of the plurality of packet replicators generates the same hierarchical relationship.

8. The method of claim 7, wherein defining the hierarchical relationship within each of the plurality of packet replicators comprises:
    identifying which of the plurality of interfaces of the network router are involved in a multicast session from a multicast list;
    identifying which of the plurality of packet replicators associated with the identified interfaces are involved in the multicast session;
    generating a hierarchical data structure that represents the hierarchical relationship of the identified packet replicators located within the network router; and
    performing de-centralized replication by replicating the multicast packets within the network router in accordance with the hierarchical data structure using the packet replicators.

9. A network router comprising:
    a plurality of interfaces;
    a plurality of packet replicators located within the network router, wherein each of the packet replicators is associated with a set of one or more of the interfaces; and
    a hierarchical data structure for replicating multicast packets that represents a hierarchical relationship for the plurality of packet replicators located within the network router,
    wherein the packet replicators replicate a multicast packet by producing a plurality of copies of the multicast packet in accordance with the hierarchical relationship of the packet replicators and outputting the copies of the multicast packet on the interfaces of the network router with which the packet replicators are associated.

10. The network router of claim 9, wherein each of the packet replicators generates copies of the multicast packet for any downstream packet replicators of the network router corresponding to the hierarchical relationship and forwards the copies of the multicast packet to the downstream packet replicators.

11. The network router of claim 10, wherein each of the packet replicators generates copies of the multicast packet for the set of interfaces with which the packet replicator is associated and outputs the replicated multicast packets on the interfaces of the set of interfaces with which the packet replicator is associated.

12. The network router of claim 9, wherein each of the packet replicators associates the hierarchical data structure with a corresponding multicast list and stores the hierarchical data structure and the association with the corresponding multicast list.

13. The network router of claim 12, wherein one of the plurality of packet replicators associated with the interface that receives the multicast packet associates a source address and destination address pair of the multicast packet with the multicast list corresponding with the hierarchical data structure, accesses the hierarchical data structure associated with the multicast list and communicates the multicast packet to at least one of the other packet replicators that corresponds to a top of the hierarchical relationship.

14. The network router of claim 13, wherein:
    the hierarchical data structure includes more than one packet replicator corresponding to the top of the hierarchical relationship; and the one of the packet replicators generates associated with the interface that received the multicast packet copies of the multicast packet for each of the packet replicators corresponding to the top of the hierarchical relationship and communicates one of the copies of the multicast packet to each the packet replicators corresponding to the top of the hierarchical relationship.

15. The network router of claim 10, wherein each of the plurality of packet replicators independently generates the same hierarchical relationship.

16. The network router of claim 15, wherein each of the plurality of packet replicators identifies which of the plurality of interfaces of the network router are involved in a multicast session from a multicast list, identifies which of the plurality of packet replicators associated with the identified interfaces are involved in the multicast session, generates a hierarchical data structure that represents the hierarchical relationship of the identified packet replicators located within the network router, and replicates the multicast packets within the network router in accordance with the hierarchical data structure using the packet replicators.

17. The method of claim 1, wherein each of the plurality of packet replicators performs packet-forwarding for a corresponding set the interfaces of the network router.

18. The network device of claim 1, wherein each of the plurality of packet replicators comprises a packet-forwarding engine that performs packet-forwarding for a corresponding set the interfaces of the network router.

19. A network router comprising:

a plurality of network interfaces; and a plurality of packet-forwarding engines located within the network router and interconnected by a switch fabric, wherein each of the packet forwarding engine performs packet-forwarding for packets received from a set of one or more of the network interfaces of the network router and replicate multicast packets in accordance with a hierarchical data structure in which the packet-forwarding engines are arranged in a plurality of tiers, wherein the packet-forwarding engines replicate a multicast packet by repeatedly producing copies of the multicast packet with packet-forwarding engines in one of the tiers, outputting the copies on the network interfaces of the packet-forwarding engines of the tier and forwarding the copies of the multicast packets through the switch fabric to the packet-forwarding engines of a next tier for additional replication until all copies of the multicast packet have been produced and output the network interfaces in accordance with the hierarchical data structure.

* * * * *

UNITED STATES PATENT AND TRADEMARK OFFICE
CERTIFICATE OF CORRECTION

PATENT NO. : 7,864,769 B1  
APPLICATION NO. : 12/193508  
DATED : January 4, 2011  
INVENTOR(S) : Woo et al.

Page 1 of 1

It is certified that error appears in the above-identified patent and that said Letters Patent is hereby corrected as shown below:

Column 13, line 6 (claim 14): "to each the packet" should be -- to each of the packet --

Column 13, line 24 (claim 17): "set the interfaces" should be -- set of the interfaces --

Column 14, line 2 (claim 18): "set the interfaces" should be -- set of the interfaces --

Column 14, line 22 (claim 19): "output the network" should be -- output on the network --

Signed and Sealed this
Tenth Day of April, 2012

David J. Kappos
*Director of the United States Patent and Trademark Office*